United States Patent [19]

Cicci

[11] 4,325,209
[45] Apr. 20, 1982

[54] METHOD AND APPARATUS FOR IN-FIELD CROP HARVESTING

[75] Inventor: George B. Cicci, Burr Ridge, Ill.

[73] Assignee: International Harvester Company, Chicago, Ill.

[21] Appl. No.: 258,254

[22] Filed: Apr. 28, 1981

[51] Int. Cl.³ .............. A01D 45/00; A01D 55/00; A01D 91/04

[52] U.S. Cl. ................... 56/1; 56/16.4; 56/229; 56/DIG. 2

[58] Field of Search .............. 56/229, 1, 16.4, DIG. 2

[56] References Cited

U.S. PATENT DOCUMENTS

| | | | |
|---|---|---|---|
| 3,252,249 | 5/1966 | Propst | 56/229 |
| 3,276,194 | 10/1966 | Mohn et al. | 56/DIG. 2 |
| 3,552,304 | 1/1971 | French | 100/37 |
| 3,775,133 | 11/1973 | Balley, Jr. | 426/454 |
| 3,823,128 | 7/1974 | Bickoff et al. | 426/656 |
| 4,109,448 | 8/1978 | Kline | 56/1 |
| 4,240,244 | 12/1980 | Martin | 56/16.4 |
| 4,287,708 | 9/1981 | Neely, Jr. | 56/16.4 |

FOREIGN PATENT DOCUMENTS

| | | | |
|---|---|---|---|
| 2222938 | 10/1974 | France | 56/DIG. 2 |
| 2019731 | 11/1979 | United Kingdom | 56/16.4 |
| 240596 | 3/1969 | U.S.S.R. | 56/1 R |

Primary Examiner—Paul J. Hirsch
Attorney, Agent, or Firm—N. C. Johnson; F. D. AuBuchon

[57] ABSTRACT

A self-propelled crop harvester having a header for harvesting crop material, a macerator for shredding the crop into small particles, a press for separating the crop material into liquid and fibrous fractions, a blower for conveying the fibrous fraction into a trailing wagon, a separator for separating the liquid fraction into a protein portion and a heated deproteinized juice, and a system for directing the deproteinized juice in a high pressure flow to cut the standing crop at the header. In another embodiment the heated juice is applied to the standing crop to moisten and heat the crop for more efficient subsequent processing.

18 Claims, 3 Drawing Figures

METHOD AND APPARATUS FOR IN-FIELD CROP HARVESTING

BACKGROUND OF THE INVENTION

1. Field of the Invention

The invention relates generally to crop harvesting and more particularly to an improved method and apparatus for harvesting a crop by using a liquid component of the crop as a cutting medium or as a moistening and heating agent for the crop.

2. Prior Art

U.S. Pat. No. 4,109,448 shows a field going crop harvester which processes alfalfa into a fibrous portion, a protein portion, and a deproteinized juice. This juice is deposited on the ground beneath the harvester to fertilize the ground and provide a means for disposing of the substantial amount of this so-called "brown juice" created in the process of separating the protein from the crop material. The machine shown in U.S. Pat. No. 4,109,448 cuts the crop with what appears to be (FIG. 2) a conventional reciprocating knife and sickle cutterbar arrangement subject ot plugging and wear.

In the subject patent the green protein is obtained in a process wherein the crop liquid fraction is heated to coagulate the green protein for subsequent mechanical separation from the brown juice. Of course, energy is required in the heating step which includes raises the temperature of the brown juice. Since the brown juice is then deposited onto the ground, the heat in the brown juice is lost.

Energy considerations are more important now than ever before. Examples of patents which reflect times wherein energy availability and costs were perhaps summarily viewed are U.S. Pat. Nos. 1,255,982, 2,397,363, 2,639,553, 2,698,170, and 3,585,730. Each of these patents shows a field-going crop heating system to enhance curing and feed value of hay and forage crops. As shown in U.S. Pat. No. 3,373,679 it is known that the addition of a hot fluid to a material being pressed can reduce the power required to drive the press. This '679 patent is not however, related to solving problems in field-going harvesting machines.

U.S. Pat. Nos. 3,552,304, 3,775,133, and 3,823,128 relate to crop material processing systems wherein portions of the expressed or separated liquid are recycled into the raw material being processed. The recycled liquids appear to be cooled or unheated upon recycling. None of these patents is related to field-going harvesting machines.

SUMMARY

The invention provides a method and apparatus for crop harvesting wherein a liquid portion is separated from the crop material and, in one embodiment, is directed against a standing crop to sever the crop from the ground. In another embodiment the crop liquid portion is applied to the crop to heat and moisten the crop prior to subsequent processing steps. In the preferred forms of the invention the foregoing is accomplished in a field-going crop harvester and processor particularly adapted for harvesting and processing alfalfa into liquid and fibrous fractions. The liquid fraction is separated into a protein portion and a heated deproteinized juice, the latter being produced in large quantities creating the aforementioned disposal problems. The present invention utilizes the heat in the deproteinized juice (which would heretofore be lost) to reduce the power and energy required in subsequent processing steps. Moreover, the deproteinized juice can be used as the cutting medium for a standing crop thus eliminating problems of vibration, plugging, etc. common in conventional crop cutting knife and sickle cutterbars.

Briefly, the objects of the invention are to provide a method and apparatus for crop harvesting wherein: energy requirements are reduced; conventional crop cutting mechanisms are eliminated; the foregoing objects are accomplished by utilizing a crop liquid portion heretofore used merely as a fertilizer; and, the method and apparatus involves a field going harvester.

DESCRIPTION OF THE PREFERRED EMBODIMENT

Figure 1:
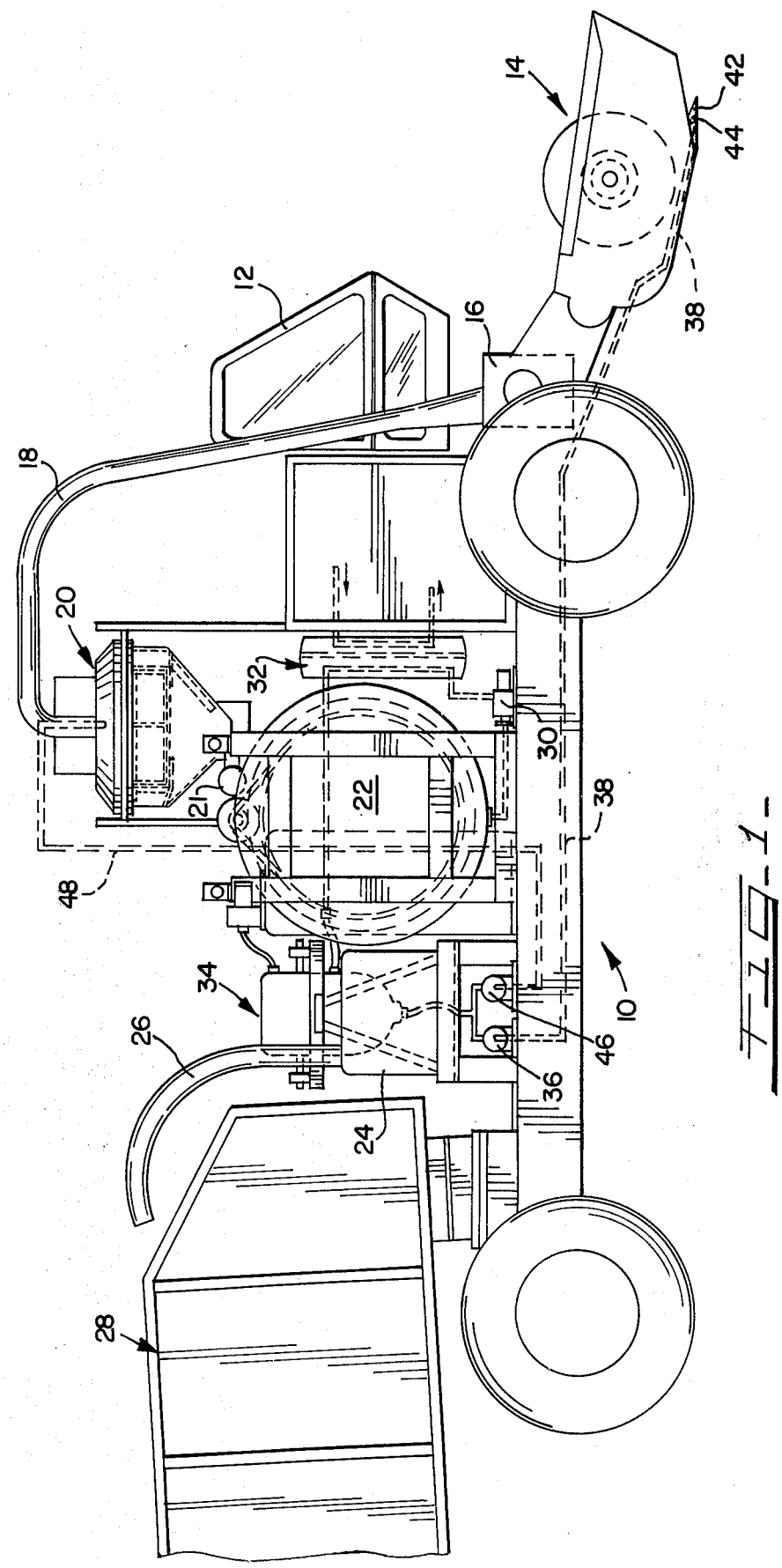
FIG. 1 is a side elevation view of the crop harvester of the invention.
Figure 2:
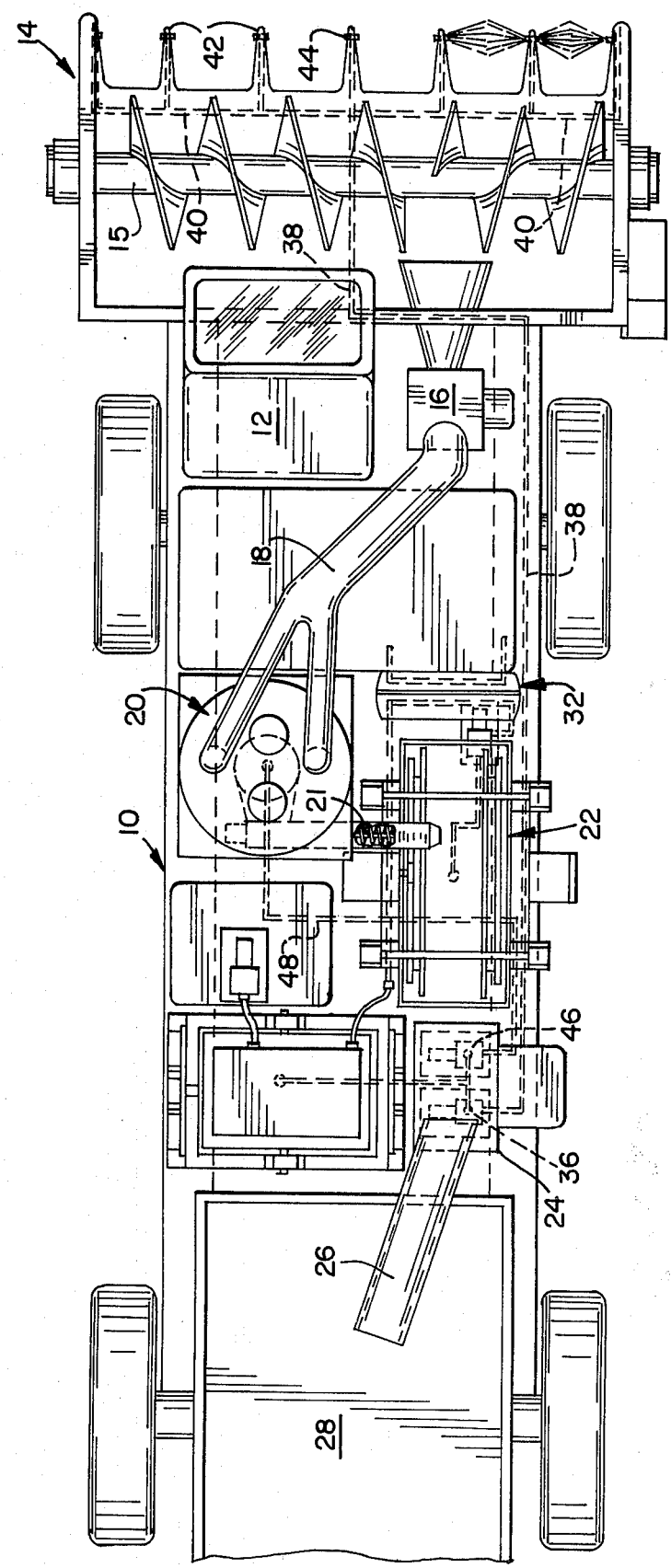
FIG. 2 is a plan view of the crop harvester of FIG. 1.

Referring first to FIGS. 1 and 2 there is shown a self-propelled crop harvester having crop processing structure as shown in U.S. Pat. No. 4,109,448 which is incorporated by reference herein. The harvester includes a self-propelled chassis 10 controlled by an operator within a cab 12. A crop harvesting header 14 is mounted on the front of the chassis 10 for cutting a standing crop such as alfalfa and collecting and directing the crop rearwardly, via an auger 15, for subsequent processing. The header 14 incorporates a unique crop cutting mechanism to be subsequently described and in a second embodiment a unique crop wetting and heating structure.

The crop material is conveyed by a blower 16 upwardly and rearwardly through a bifurcated conduit 18 into a macerator 20. The macerator is shown at 21 in U.S. Pat. No. 4,109,448 and its constructional details are shown in FIGS. 3 through 6 thereof.

The macerated alfalfa emerges from the bottom of the macerator 20 and is conveyed by a power driven auger 21 into a cone press 22 described and shown in detail in FIGS. 7 through 11 of the above mentioned U.S. Pat. No. 4,109,448. The press 22 applies forces to the macerated alfalfa to press liquid from the alfalfa thus separating the crop material into liquid and fibrous fractions.

The fibrous fractions of the alfalfa is discharged from press 22 into a blower 24 which conveys that fraction through a discharge chute 26 into a trailing wagon 28.

The liquid fraction of the alfalfa is conveyed from the press 22 by a pump 30 into a heat exchanger 32 constructed and functional as the heat exchanger 41 in the above mentioned U.S. Pat. No. 4,109,448. The heated liquid fraction is conveyed into a fractionating tank 34 constructed and functional as the tank 44 in U.S. Pat. No. 4,109,448. As described in that patent the liquid fraction is separated into a protein fraction (curd or green material) and a deproteinized liquid (whey) often referred to as the "brown juice". As described in the '448 patent the deproteinized juice is applied onto the field as a fertilizer through the spray nozzles 58.

In accordance with an important feature of the invention herein the heated deproteinized brown juice derived in the protein extraction process is utilized as the crop cutting medium. As shown in FIGS. 1 and 2 a pump 36 conveys brown juice from the tank 34 forwardly under high pressure thorough a conduit 38 to a manifold 40 on the header 14. The header 14 includes a plurality of crop dividers 42 projecting forwardly from the header closely adjacent the ground. The manifold 40 directs the high pressure liquid into each of the crop dividers 42 from which the liquid is ejected in a high pressure stream through laterally disposed orifices 44 defined in the crop dividers. As seen in FIG. 1 the liquid is ejected in mutually opposed high pressure patterns to sever the crop between the crop dividers 42 as the harvester moves forwardly. Accordingly, it will be seen that the brown juice, which heretofore was merely discarded onto the ground for whatever fertilizer value it may have, is used as the crop cutting medium and eliminates the mechanical cutting assemblies used heretofore.

Another feature of applicant's invention shown in FIGS. 1 and 2 is the provision of means for directing a portion of the heated deproteinized brown juice into the macerator 20. A pump 46 conveys brown juice from the tank 34 through a conduit 48 into the top of the macerator 20. It has been found that less power is required to operate the macerator when the incoming crop material has been wetted. This significant advantage is achieved by using the liquid which would have otherwise merely been discarded onto the ground.

Figure 3:
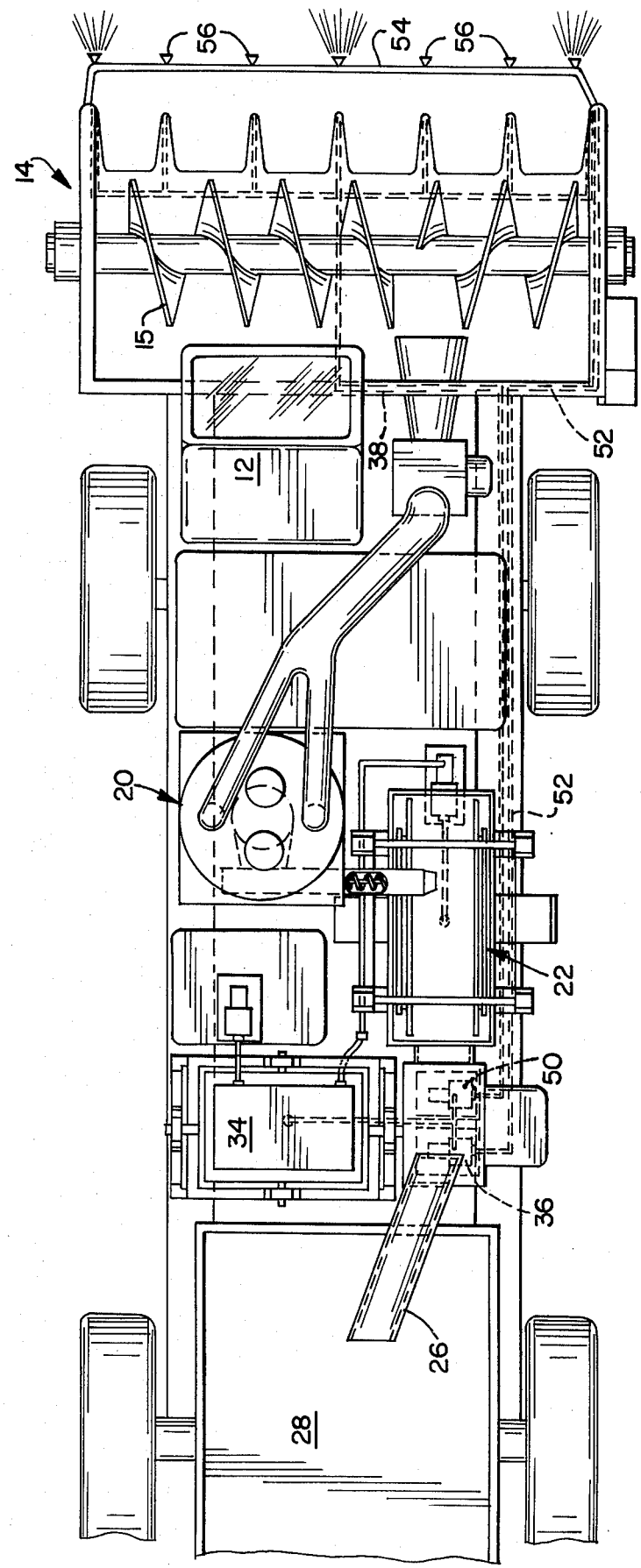
FIG. 3 is a plan view of a second embodiment of the invention.

FIG. 3 shows another embodiment of the invention wherein a pump 50 conveys heated brown juice to a conduit 52 to a spray boom 54 extending across the header 14. A plurality of spray nozzles 56 is mounted on the boom 54 to direct the heated brown juice onto the standing crop. As described in U.S. Pat. No. 4,109,448 the separation of the liquid crop fraction into the green protein and brown juice portions is caused by a thermal process. Accordingly, less energy is ultimately required in the separation step where the incoming crop material has been preheated by application of the heated brown juice via the spray nozzles 56.

The invention in both its embodiments provides a novel means for cutting the standing crop by using one of the products of the protein extraction process. Directing a portion of that same product (deproteinized brown juice) into the macerator reduces its power requirements and thus saves energy. In its second embodiment the invention utilizes the heat in the brown juice to preheat the crop being harvested to thus reduce the energy required in the protein separation process.

By the foregoing applicant has provided an invention well suited to accomplish the objects of the invention.

What is claimed is:

1. A method for harvesting a standing crop comprising the steps of:
    separating a liquid portion from the crop; and
    directing at least a portion of said liquid portion in a high pressure flow to sever the standing crop from the ground.

2. A method for harvesting a standing crop comprising the steps of:
    collecting the crop with a mobile harvester as it advances through a field;
    separating a liquid fraction from the collected crop in the mobile harvester; and
    severing the standing crop from the ground as the harvester advances by directing a high pressure flow of the crop liquid fraction thereagainst, whereby the liquid fraction is utilized to perform a crop harvesting step.

3. A method for harvesting a standing crop with a mobile harvester, the method comprising the steps of:
    collecting the crop as the harvester moves through a field;
    separating the crop in the harvester into a fibrous fraction and a liquid fraction;
    fractionating said liquid fraction in the harvester into a protein portion and deproteinized juice; and
    directing the deproteinized juice at high pressure against the standing crop as the harvester moves through the field to sever the crop from the ground.

4. The method according to claim 3, wherein said directing step includes the step of spraying the juice at the standing crop at a plurality of points along the transverse extent of the harvesting path traversed by the harvester.

5. A method for processing a crop with a mobile harvester, comprising the steps of:
    collecting the crop as the harvester moves through a field;
    macerating the crop in the harvester;
    extracting a liquid from the macerated crop in the harvester; and
    applying the liquid to the crop prior to the macerating step thereby reducing the power required for maceration.

6. a method for harvesting a standing crop with a mobile harvester, the method comprising the steps of:
    collecting the crop as the harvester moves through a field;
    macerating the crop in the harvester;
    separating the crop in the harvester into a fibrous fraction and a liquid fraction;
    fractionating said liquid fraction in the harvester into a protein portion and a deproteinized juice; and
    applying the deproteinized juice onto the crop prior to the macerating step thereby reducing the power required for maceration.

7. A method for processing a crop with a mobile harvester, the method comprising the steps of:
    collecting the crop as the harvester moves through a field;
    separating the crop in the harvester into a fibrous fraction and a liquid fraction;
    heating the liquid fraction in the harvester to cause separation into a protein portion and a deproteinized juice; and
    applying the heated deproteinized juice onto the crop as the crop is being collected whereby heat from the juice is transferred to the crop to minimize energy required in processing the crop.

8. A method for processing a crop with a mobile harvester, comprising the steps of:
    collecting the crop on the harvester as it moves through a field;
    separating the crop in the harvester into portions including a liquid;
    heating said liquid; and
    applying the heated liquid to the crop prior to the separating step to raise the crop temperature and thus enhance the effectiveness of the separation step.

9. An apparatus for harvesting a standing crop, comprising:

means for separating a liquid portion from the crop; and means for directing at least a portion of said liquid portion in a high pressure flow to sever the standing crop from the ground.

10. An apparatus for harvesting a standing crop, comprising:

a mobile harvester;

means on the harvester for collecting the crop as the harvester advances through a field;

means for separating a liquid fraction from the collected crop in the mobile harvester; and means for severing the standing crop from the ground as the harvester advances by directing a high pressure flow of crop liquid fraction thereagainst, whereby the liquid fraction is utilized to perform a crop harvesting step.

11. An apparatus for harvesting a standing crop, comprising:

a mobile harvester;

means for collecting the crop as the harvester moves through a field;

means for separating the crop in the harvester into a fibrous fraction and a liquid fraction;

means for fractionating said liquid fraction in the harvester into a protein portion and a deproteinized juice; and means for directing the deproteinized juice at high pressure against the standing crop as the harvester moves through the field to sever the crop from the ground.

12. The subject matter of claim 11, wherein said directing means includes means for spraying the juice at the standing crop at a plurality of points along the transverse extent of the harvesting path traversed by the harvester.

13. An apparatus for processing a crop, comprising:

a mobile harvester;

means for collecting the crop as the harvester moves through a field;

means for macerating the crop in the harvester;

means for extracting a liquid from the macerated crop in the harvester; and means for applying the liquid to the crop prior to macerating the crop thereby reducing the power required for maceration.

14. The subject matter of claim 13, including means for conveying a portion of said liquid into said macerating means.

15. An apparatus for harvesting a standing crop, comprising:

a mobile harvester;

means for collecting the crop as the harvester moves through a field;

means for macerating the crop in the harvester;

means for separating the crop in the harvester into a fibrous fraction and a liquid fraction;

means for fractionating said liquid fraction in the harvester into a protein portion and a deproteinized juice; and means for applying the deproteinized juice onto the crop prior to macerating the crop thereby reducing the power required for maceration.

16. The subject matter of claim 15, including means for directing a portion of the liquid against the standing crop to sever the crop from the ground.

17. An apparatus for processing a crop, comprising:

a mobile harvester;

means for collecting the crop in the harvester as it moves through a field;

means for separating the crop in the harvester into a fibrous fraction and a liquid fraction;

means for heating the liquid fraction in the harvester to cause separation into a protein portion and a deproteinized juice; and means for applying the heated deproteinized juice onto the crop as the crop is being collected whereby heat from the juice is transferred to the crop to minimize energy required in processing the crop.

18. An apparatus for processing a crop, comprising:

a mobile harvester;

means for collecting the crop on the harvester as it moves through a field;

means for separating the crop on the harvester into portions including a liquid;

means for heating said liquid; and means for applying the heated liquid to the crop prior to separating the crop to raise the crop temperature and thus enhance the effectiveness of the separation means.

* * * * *